H. WATKINS.
SAW SETTING MACHINE.
APPLICATION FILED JULY 27, 1906. RENEWED AUG. 9, 1909.

937,904.

Patented Oct. 26, 1909.
2 SHEETS—SHEET 1.

WITNESSES

INVENTOR
H. Watkins.
BY
Howard P. Denison
ATTORNEY

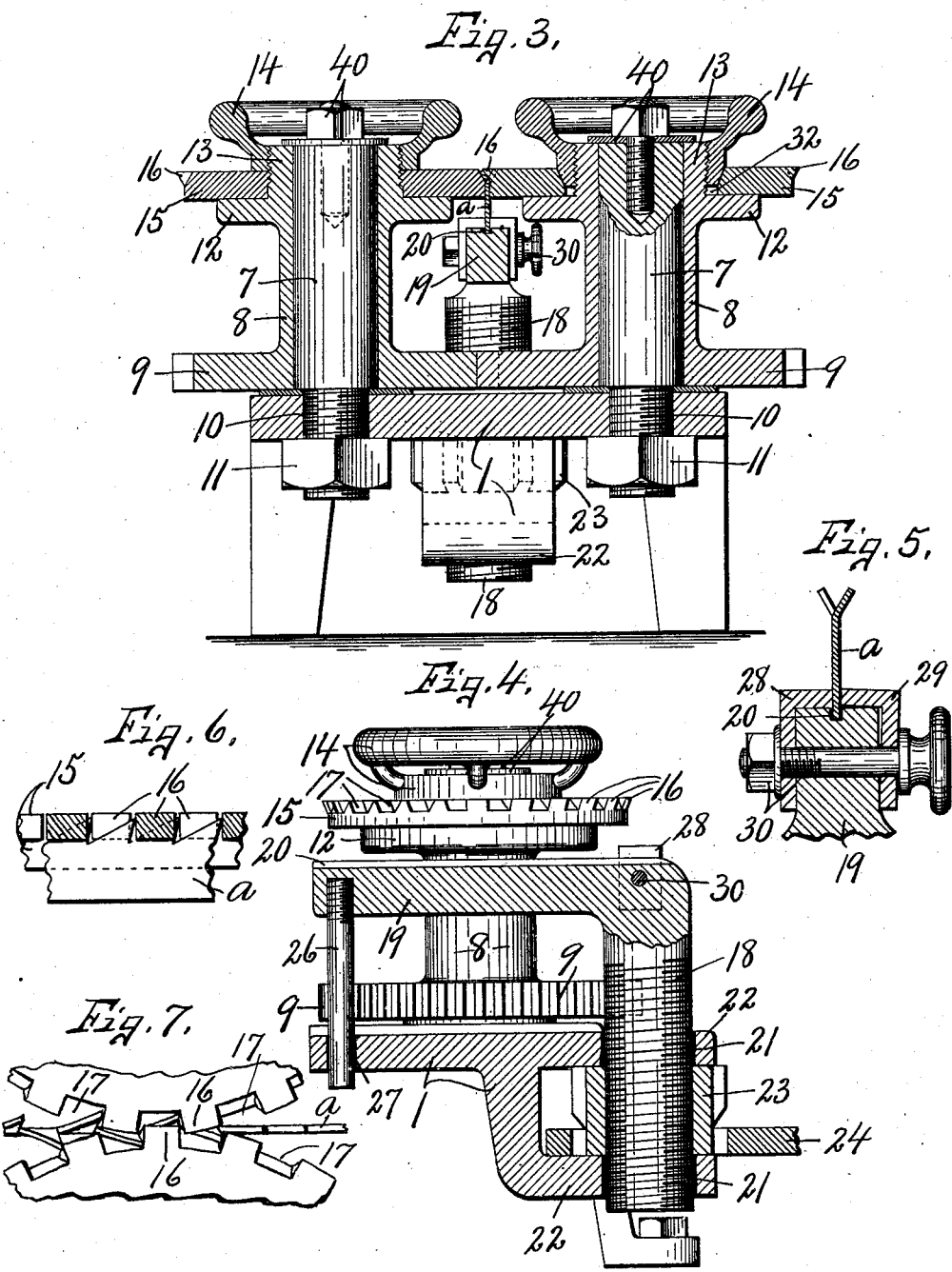

UNITED STATES PATENT OFFICE.

HARRY WATKINS, OF UTICA, NEW YORK, ASSIGNOR OF ONE-HALF TO DELOS DE WOLF SMYTH, OF UTICA, NEW YORK.

SAW-SETTING MACHINE.

937,904.

Specification of Letters Patent.

Patented Oct. 26, 1909.

Application filed July 27, 1906, Serial No. 328,039. Renewed August 9, 1909. Serial No. 512,036.

*To all whom it may concern:*

Be it known that I, HARRY WATKINS, of Utica, in the county of Oneida, in the State of New York, have invented new and useful Improvements in Saw-Setting Machines, of which the following, taken in connection with the accompanying drawings, is a full, clear, and exact description.

This invention relates to certain improvements in saw setting machines, and is particularly adapted for setting the teeth of band and other saws of substantially uniform width throughout their length and involves the use of two simultaneously driven rotary disks having intermeshing saw setting teeth operated to set alternate teeth of the saw in opposite directions as the saw is fed between the disks.

One of the essential objects of my present invention is to utilize the saw setting teeth of the disks to feed the saw longitudinally, thereby obviating the necessity for a separate feeding device.

Another object is to provide for the lateral adjustment of one of the disks to permit the saw to be inserted edgewise between the meeting faces of said disks, and also to provide means for automatically centering and clamping said adjustable disk upon its rotary supporting sleeve.

A further object is to provide a vertically adjustable longitudinal supporting guide for the saw whereby the teeth of saws of various widths may be brought into proper registration with the saw setting teeth of the disks.

A still further object is to provide friction clamps for engaging the opposite sides of the saw at the rear of the saw setting disks to keep the saw reasonably tight and thereby prevent kinking or buckling as it is fed by the saw setting disks along the guide.

Other objects and uses will appear in the following description.

Figure 1:
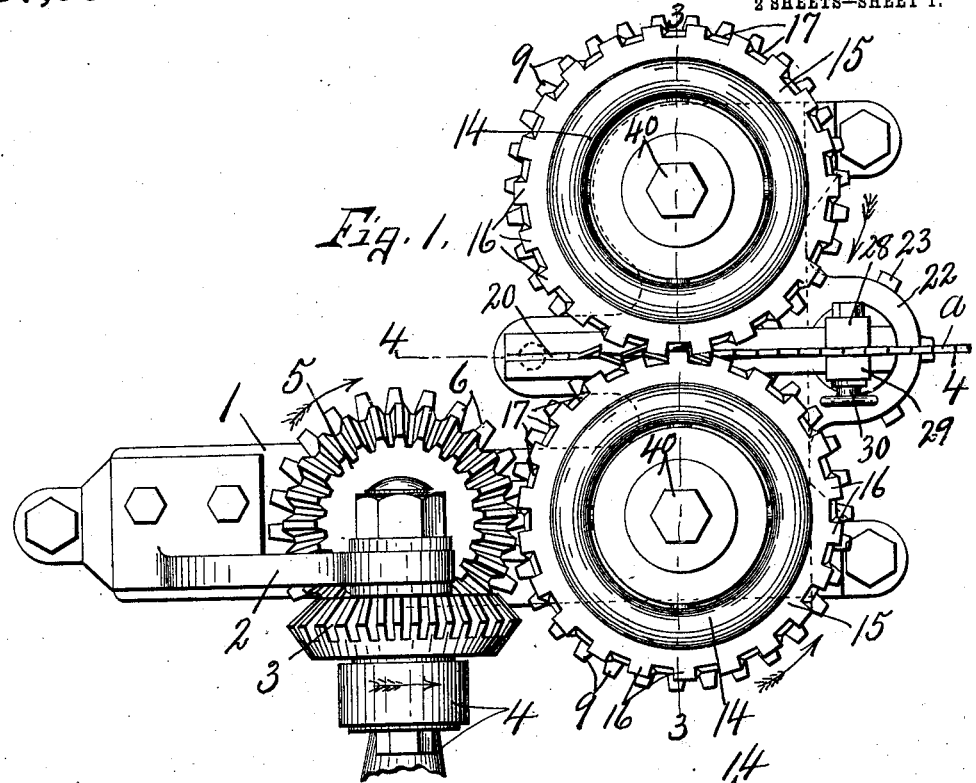
Figure 2:
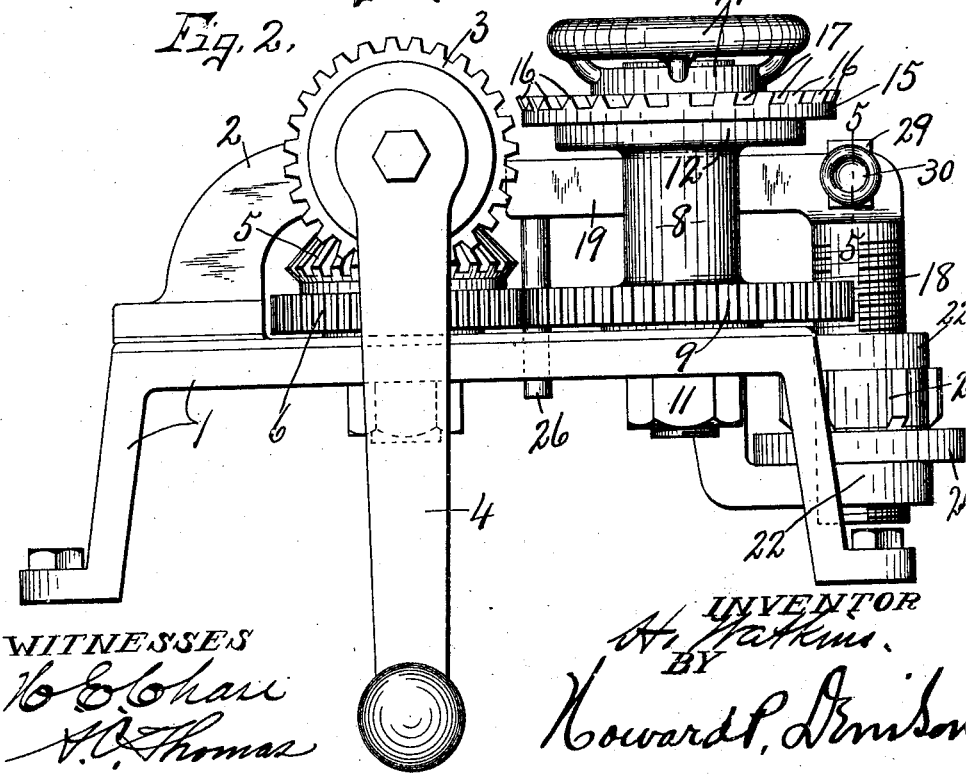

In the drawings, Figures 1 and 2 are respectively a top plan and side elevation of a saw setting machine embodying the various features of my invention. Figs. 3 and 4 are sectional views taken respectively on lines 3—3 and 4—4, Fig. 1. Fig. 5 is a sectional view taken on line 5—5, Fig. 2. Fig 6 is an enlarged detail view of portions of the saw and teeth of the saw setting disks. Fig. 7 is a top plan of a portion of the saw and meeting sides of the disks showing particularly the manner of feeding the saw.

In order to clearly demonstrate the practicability of my invention, I have shown a supporting bed or frame —1— of cast metal or other suitable material adapted to be secured to any available support to retain the various parts of my invention in convenient positions for operation by hand or other power.

Mounted upon and projecting upwardly from the top of the table —1— is a bracket —2— upon which is journaled a driving gear —3— operated by a crank arm —4—4 and meshing with a similar gear —5—. This latter gear is secured to a spur gear —6—, both of the gears 5— and —6— being mounted upon the same axis and journaled on the top of the supporting bed or table —1—.

A pair of upright spindles or studs —7— are rigidly secured to and rise from the top of the bed or table —1— for receiving and supporting revoluble sleeves —8— having intermeshing spur gears —9— rigid therewith, one of said gears —9— meshing with and receiving rotary motion from the driving spur gear —6—.

The lower ends of the spindles or studs —7—, which are reduced in diameter, are threaded and pass through apertures —10— in the bed —1—, said threaded ends being provided with nuts —11—, which engage the under side of the bed and rigidly hold the studs in operative position, parallel with each other, but having their axes spaced a distance apart substantially equal to the pitch diameter of the intermeshing gears —9—. The gears —9— are of substantially the same pitch diameter and are preferably cast integral with the lower ends of the sleeves —8—. The upper ends of said sleeves are provided with enlarged annular flanges —12— and reduced upper extremities, which are threaded and engaged by suitable hand nuts or clamping devices —14—.

Mounted upon the upper reduced ends of the sleeves —8— and resting upon the annular flanges —12— are a pair of similar saw setting disks —15—, which are held in place by the respective clamping nuts —14—, and are each provided with a series of radially projecting teeth —16— and intervening spaces —17—, the teeth and spaces being nearly of uniform circumferential width and are so arranged that the teeth of each disk intermesh with the spaces of the other disk at their meeting sides.

The circumferential length of the teeth —16— and spaces —17— are each of substantially the same length as the saw teeth which are to be set, and I provide several sets of disks of uniform diameter but having their teeth spaced corresponding to different saws having a different number of teeth per unit of length. In other words, when saws having a different number of teeth per unit of length are to be set, different disks are used having their saw setting teeth spaced corresponding to the distances between the saw teeth, which are to be set.

The teeth —16— of each disk are formed upon the upper portion of the periphery of said disk and project a distance beyond the periphery of the lower portion of the disk, the distance corresponding to the amount of set which it is required to give to the saw teeth, the lower outer edges of said teeth being beveled or inclined forwardly or upwardly to give the desired angle of set to the saw tooth. The inner sides of the spaces between the teeth are also beveled upwardly and inwardly at substantially the same angle as and parallel with the beveled planes of the tooth which enters such space, said beveled sides of the spaces of each disk forming abutments or forms against which the saw teeth are pressed by the saw setting teeth of the other disk.

It is evident from the foregoing description that the saw setting teeth on the adjacent sides of the disks intermesh or lap side by side with just sufficient clearance between the beveled meeting faces of the disks to receive the saw teeth.

The portions of the peripheries of the disks —15— below the spaces are substantially vertical and parallel with just sufficient space between their meeting faces to receive the blade of the saw as —a—, so that the saw blade as well as its teeth are frictionally impinged between the contiguous faces of the disks and operate to feed the saw longitudinally and continuously as the disks are rotated in the manner previously described.

In this class of machines it is necessary to support and guide the saws of different widths while being fed upwardly in the act of setting the teeth so that the teeth of the saw may be properly adjusted to the saw setting teeth, and for this purpose, I provide a vertically adjustable threaded spindle —18— with a laterally projecting arm —19— extending between the sleeves —8— and provided with a longitudinal groove —20— in which the lower edge of the saw blade is guided during its longitudinal movement.

The threaded spindle —18— is mounted for vertical adjustment in vertically alined apertures —21— in separated arms —22— on the supporting bed —1—, and is engaged by a nut —23— which is held between the arms —22— and adapted to be rotated by a wrench as —24— as best seen in Figs. 2 and 4.

The opposite end of the guide arm —19— is provided with a depending stud —26— having its lower end guided in an aperture —27— in the frame —1— to prevent rotation of the spindle —18— and to co-act with said spindle to keep the groove —20— in vertical and longitudinal alinement with the tangent of the meeting faces of the disks.

In order to prevent kinking or buckling of the saw blade while being fed upwardly by the saw setting disks, I provide suitable friction jaws —28— and —29— of angular cross section which are fitted upon opposite longitudinal edges or corners of the guide arm —19— at the rear of the disks —15—, one of said jaws as —29— being adjustable, and both are held in place by a clamping screw —30— which is passed through suitable apertures in the guide —19— and jaws —28— and —29—.

The meeting faces of the jaws —28— and —29— lie directly over, and are in alinement with the guide groove —20— so as to engage the opposite sides of the saw blade, sufficient clearance being left between the jaw —29— and adjacent faces of the guide arm —19— to allow for a limited adjustment of said jaw to vary its friction with the saw blade.

In setting the teeth of band saws, which, of course, are endless, it is necessary to provide for the radial adjustment of, at least, one of the disks —15—, and in order that this adjustment may be effected quickly and economically, the opening as —32— in one of the disks for receiving the reduced portion —13— of the sleeve —8—, is circular and of greater diameter than the reduced portion —13—, said opening being of such size as to permit its disk —15— to be moved radially away from the opposite disk to form an intervening space between the meeting edges of said disks of sufficient size to permit the saw blade to be inserted from the top downwardly between said meeting faces, with the lower edge of said blade resting in the groove —20—, after which the adjustable disk —15— is moved inwardly against the adjacent side of the blade, and is clamped in place by the hand nut —14—.

In order that the adjustable disk —15— may be properly centered while being clamped in place, its opening —32— is tapered inwardly and the lower end of the nut —14— is similarly tapered to fit snugly within the tapering portion of the opening —32— so that when the nut —14— is tightened it not only centers the disk but also firmly clamps it upon the flange —12— of the sleeve —8—. The other disk, in this instance is not adjustable radially, but also has a center opening of substantially the same diameter as that of the reduced portion —13— upon which it fits, this latter disk being clamped by the hand nut —14— against the flange —12— of the adjacent disk —8—.

As previously stated, one of the important features of my invention is that the same disks which set the saw teeth also feed the saw lengthwise, and owing to the fact that the length of the saw setting teeth is substantially equal to the saw teeth, the advancing edges of the saw setting teeth engage the cutting edges of the saw teeth successively, and thereby feed the saw longitudinally during the operation of setting the teeth, this operation being more clearly set forth in Figs. 6 and 7, although distinctly shown in Fig. 1.

In operation, the first care is to select the saw setting disks, the teeth of which are spaced to correspond to the spaces of the saw teeth which are to be set, said disks being placed upon their respective supporting sleeves —8— in the manner previously described, and clamped in place by the nuts —14—, the guide —19— being adjusted to support the saw with its teeth in proper position to be engaged and set by the teeth of the disks. When the saw is properly positioned upon its guide with its teeth between the saw setting disks, the operator simply rotates the crank arm —4— from which rotary motion is transmitted to the saw setting disks through the medium of the gears —3—, —5— and —9—. By this construction and arrangement of the parts of the saw setting machine, the saw setting disk may be rotated at any desired speed with a certain assurance that the saw will be continuously fed forwardly and its teeth set successively and uniformly.

The saw setting disks are of equal diameter, having the same number of teeth and are, therefore, interchangeable as are also the sleeves —8—, which are held against upward displacement upon their respective spindles —7— by suitable cap screws —40—, said sleeves usually being formed integral with the gears —9—.

What I claim is:

1. In a saw setting machine, a pair of rotary disks having intermeshing saw setting teeth, each disk being provided with a central opening, rotary supports for said disks extending through said openings, the opening in one of the disks being of greater diameter than the portion of its support extending therethrough whereby such disk may be adjusted toward and from the other disk, means for clamping the adjustable disk upon its support, and means for rotating said supports.

2. A saw setting machine comprising a supporting bed and a pair of upright spindles rising therefrom, sleeves journaled upon said spindles and provided with intermeshing gears, said sleeves having their upper ends threaded, saw setting disks loosely mounted upon the upper ends of the sleeves, and a pair of nuts, each screwed upon the upper end of one of the sleeves to clamp the corresponding disk thereto, one of said nuts and its corresponding disk having tapering engaging faces whereby the disk is centered as it is clamped in place by the nut.

3. A saw setting machine comprising a supporting bed and a pair of upright spindles rising therefrom, sleeves journaled on the spindles and provided with annular flanges, said sleeves having their upper ends threaded, disks surrounding the upper threaded ends of the sleeves and resting on said flanges, said disks being provided with intermeshing saw setting teeth, one of the disks having a tapering opening of greater diameter than the portion of the sleeve which it surrounds, whereby it may be moved radially to disengage its saw setting teeth from those of the other disk, a nut having a tapering end fitting in the tapering opening and screwed upon the adjacent sleeve to center and lock the adjacent disk upon its sleeve, and a second nut for securing the opposite disk upon its sleeve.

In witness whereof I have hereunto set my hand this 16th day of July 1906.

HARRY WATKINS.

Witnesses:
HENRY J. COOKINHAM,
E. F. BATES.